United States Patent [19]

Newcomer

[11] Patent Number: 5,114,199

[45] Date of Patent: May 19, 1992

[54] DEVICE FOR THE GATHERING AND LIFTING OF DEBRIS

[76] Inventor: William L. Newcomer, P.O. Box 253, New Market, Md. 21774

[21] Appl. No.: 668,023

[22] Filed: Mar. 12, 1991

[51] Int. Cl.$^5$ .............................................. A01B 1/00
[52] U.S. Cl. .................................... 294/50.8; 294/118
[58] Field of Search ............... 294/1.3, 1.4, 50.5–50.9, 294/51, 118; 15/104.8, 257.1, 257.6, 257.7; 56/400.11–400.13; 111/101, 106

[56] References Cited

U.S. PATENT DOCUMENTS

| | | | |
|---|---|---|---|
| 275,505 | 4/1883 | Lindsey | 294/50.8 X |
| 407,465 | 7/1889 | Brick | 294/50.8 |
| 700,192 | 5/1902 | Grummt | 294/50.8 |
| 1,761,503 | 6/1930 | Tonhardt | 294/50.8 |
| 1,970,087 | 8/1934 | Gonsalves | 294/50.8 X |
| 3,692,347 | 9/1972 | Bixler | 294/50.8 |
| 3,809,421 | 5/1974 | James | 294/50.8 |
| 4,042,270 | 8/1977 | Weiland | 294/50.8 |
| 4,477,114 | 10/1984 | Callis | 294/50.6 |
| 4,953,347 | 9/1990 | Siegfried | 294/50.8 X |
| 4,991,386 | 2/1991 | Dirksen | 294/50.8 X |

FOREIGN PATENT DOCUMENTS

| | | | |
|---|---|---|---|
| 775450 | 1/1968 | Canada | 294/50.8 |
| 724462 | 11/1966 | Italy | 294/50.8 |
| 69740 | 11/1945 | Norway | 294/50.8 |
| 599096 | 3/1948 | United Kingdom | 294/50.8 |
| 777264 | 6/1957 | United Kingdom | 294/50.8 |
| 853681 | 11/1960 | United Kingdom | 294/50.8 |

*Primary Examiner*—Johnny D. Cherry
*Attorney, Agent, or Firm*—Lalos & Keegan

[57] ABSTRACT

A device for the gathering and lifting of debris. A first blade disposed on a first pivot arm is pivotally connected to a second blade disposed on a second pivot arm. The blades are movable between an open position and a closed position. Each pivot arm includes a vertical lower extension, a middle elongated arm secured to the lower extension at a lower elbow, and an upper extension secured to the middle arm by an upper elbow. the upper elbow is grasped by the hand of the user, whereupon the upper extension will be located under and in contact with the forearm of the user. When the device is in its closed position, the rearward lower edges of the blades contact one another, while a gap is formed between the forward lower edges of the blades. The device is free standing when in the open position.

33 Claims, 2 Drawing Sheets

DEVICE FOR THE GATHERING AND LIFTING OF DEBRIS

FIELD OF THE INVENTION

The present invention relates to tools suitable for the lifting of lawn and field debris, and more a particularly, to a hand operated leaf gatherer for the collection and lifting of lawn and garden debris such as leaves, straw, and the like.

BACKGROUND OF THE INVENTION

Numerous tools have been invented to aid in the performance of yard work such as the raking of leaves, twigs, and flower bed clippings as well as spreading mulch. Such yard work typically involves a great deal of bending and straightening by the worker, which can be extremely tiring and can result in back strain. For instance, once the leaves are raked, the worker must bend down to collect and dispose of the leaves. Accordingly, it is desirable to provide a tool which allows the user to collect and lift the leaves without bending over.

In the prior art, there have been various proposals for tools which include the capability of removing the leaves from the yard or field. For example, a combination rake and garden implement has been described in U.S. Pat. No. 2,908,131 to Ross, the implement having two elongated arms to eliminate the necessity of stooping, the two arms having a rake-like portion attached thereto and being pivotally connected by a pin so as to be movable between an open and closed position. When the implement is in the open position, the implement may be used as a pickup tool. When in the closed position, the elongated arms are positioned in close parallelism with each other, allowing the device to be used as a reversible rake. This implement is limited in its function as a pickup tool in that the teeth of the rake-like portion are narrow and terminate in angularly bent, interleaving free end portions. This structure is not capable of gripping or lifting heavier debris, such as mulch or tree branches.

Another type of leaf and rubbish shovel is disclosed in U.S. Pat. No. 3,809,421 to James having two blades, each of which is substantially semi-cylindrical, the blades being hingedly connected with a handle anchored to each at its upper end. A serrated flange is attached to the lower edge of each blade to permit raking. The shovel further includes an extended handle so that an operator's forearm can be used, resulting in increased leverage for lifting heavier objects. Unfortunately, not only is the shovel bulky and heavy, but it is apparent that smaller materials might simply fall right through the opening between the two blades.

U.S. Pat. No. 4,730,864 to Sample discloses a trash gatherer having two rake-like gathering heads pivotally interconnected to provide a jaw-like action and having a spring to bias the two blade elements in an open position. One of the arm extensions of the tool includes an arm band of a flexible material having Velcro on to the ends for mounting the tool on the user's arm. The other arm extension is shorter with a hand grip to be grasped by the hand of the user. The disadvantage of this tool is the amount of force required to close the tool in order to overcome the biasing force of the spring. Additionally, the tool is cumbersome to put on and take off since the arm band must be fastened about the arm prior to use.

Other lifting tools without pivoting arms have been proposed. For example, U.S. Pat. No. 3,833,250 to Lawrence discloses a tool having two arms, each being hingedly connected to the ends of a cross handle and having rake heads at the unhinged end. Thus, an articulated tool is provided that is useful in gathering and picking up loose materials such as leaves. A tool utilizing a wire mesh to pick up debris is shown in U.S. Pat. No. 3,672,716 to Burckhalter. The tool includes two arms which are attached at one end, each arm having a wire mesh at the other end. Unfortunately, the tool is of little use in the lifting of small materials such as sand, gravel or fine mulch.

It can be seen that forementioned tools do not provide the combination of features which permits a user to avoid stooping or bending, while at the same time being versatile enough to gather, lift and transport both light and heavy materials and both large and small items. It is further desirable to provide a tool that is simple in its construction, having few mechanical parts, yet being of durable material. Thus, while the prior art tools are useful in many applications, they do not offer the advantages found in the gathering tool of the present invention.

SUMMARY OF THE INVENTION

Accordingly, it is an object of the present invention to provide an improved tool for gathering leaves and other debris.

Another object of the present invention is to provide an improved gathering tool which can be used without requiring the bending and straightening of the user.

A further object of the present invention is to provide an improved gathering tool which is free standing when not in use.

A still further object of the present invention is to provide an improved gathering tool which is light in construction and weight and is simple to use.

Other objects and advantages of the present invention will become more apparent to those persons having ordinary skill in the art to which the present invention pertains from the following description taken in conjunction with the accompanying drawings.

DETAILED DESCRIPTION OF THE PREFERRED EMBODIMENTS

Figure 1:
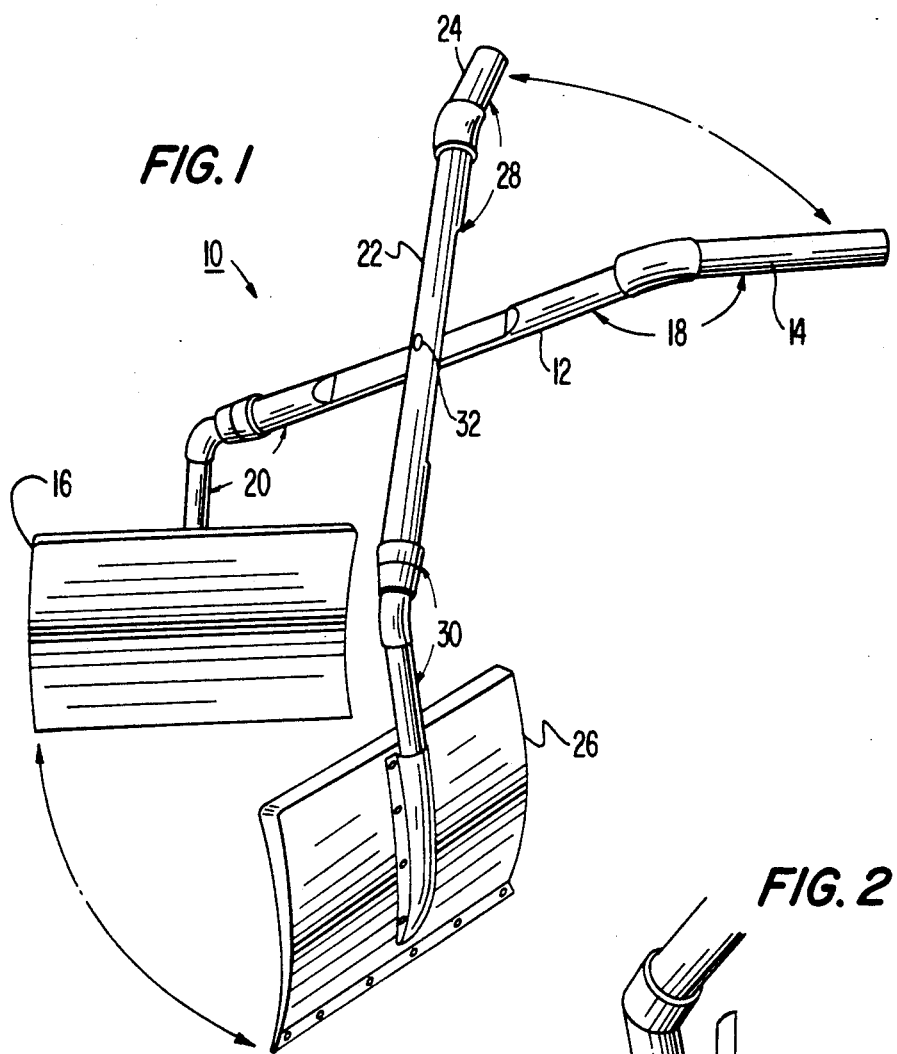
FIG. 1 is a perspective view of a preferred embodiment of the present invention in the open position.
Figure 2:
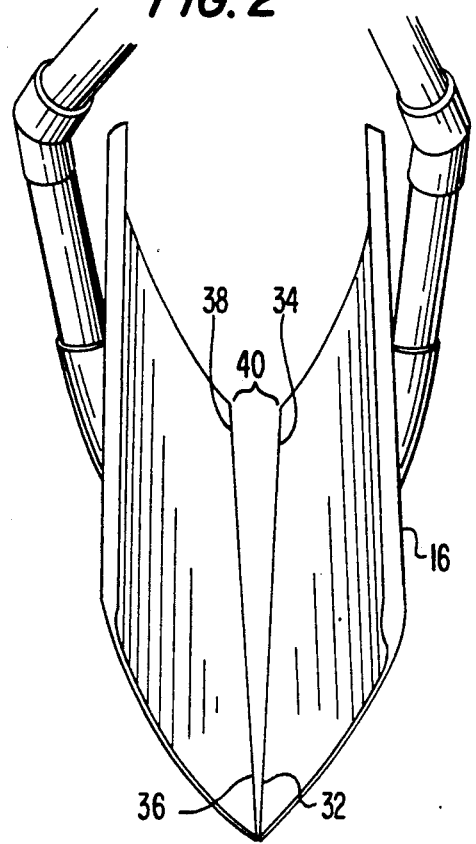
FIG. 2 is a front view of the embodiment of FIG. 1 in the closed position.

Referring to FIGS. 1 and 2, there is a tool shown generally as 10 for the gathering and lifting of debris. Tool 10 includes a first pivot arm 12 and a second pivot arm 14 pivotally connected to first pivot arm at a pivot point 16 by a pin 17 or other conventional means. The pivot arms are generally movable about pivot point 16 between an open position, as shown in FIG. 1, and a closed position, as shown in FIG. 2.

First pivot arm 12 comprises a first generally rectangular blade 18 with which the debris is to be gathered and lifted. Attached to first blade 18 is a first vertical lower extension 20 mounted to a first middle elongated arm 22 by means of a first lower elbow 24 and a first lower elbow fitting 26. Relative to first lower extension 20, first middle arm 22 extends upwardly and rearwardly toward the user at a planar angle 28. Angle 28 is intended to be in the range of 90° to 180° and is preferably approximately 135°.

Extending rearwardly and upwardly from the upper edge of first middle arm 22 is a first upper extension 30 mounted to middle arm 22 by means of a first upper elbow 32. First upper elbow 32 positions upper extension 30 at a planar angle 34 relative to middle arm 22. It is intended that angle 34 be dimensioned such that upper extension 30 is positioned at a slight angle from horizontal with the rear end of upper extension 30 being raised relative to the forward end thereof. To accomplish this, it is preferred that angle 34 be approximately 157 $\frac{1}{2}$°.

Second pivot arm 14 is generally the mirror image of first pivot arm 12 and comprises a second generally rectangular blade 36, a second vertical lower extension 38, a second lower elbow 40, a second lower elbow fitting 42, a second middle elongated arm 44, a second upper elbow 46, and a second upper extension 48. As with the first pivot arm, second middle elongated arm 44 extends upwardly and rearwardly from second lower extension 38 at a planar angle 50, intended to be in the range of 90° to 180° and preferably approximately 135°. Likewise, second upper extension 48 extends rearwardly and slightly upwardly from middle elongated arm 44 at a planar angle 52, again preferably being approximately 157 $\frac{1}{2}$°.

Referring to FIG. 2 showing the blades 18 and 36 in greater detail, it can be seen that each blade is solid and is slightly concave in shape. Blade 18 includes a lower edge 54 with a forward edge 56 and a rear edge 58 located thereon. Similarly, blade 36 includes a lower edge 60 with a forward edge 62 and a rear edge 64 located thereon. Lower edges 54 and 60 are straight and thus provide a means to completely scrape the debris from the ground. Furthermore, it can be see that when the tool is in its closed position, rear edges 58 and 64 contact each other, while forward edges 56 and 62 are provided with a gap 66 therebetween. Gap 66 is intended to be in the range of two to three inches, preferably being two and one-half inches in length. Gap 66 allows the user to provide additional torque in the blades to aid in securely grasping the debris. Additionally, each blade 18 and 36 has mounted thereon a rear enclosure wall 68 and 70, respectively. Walls 68 and 70 are perpendicular to blades 18 and 36 and have first edges 71 and 73 conforming to the concave shape of the blade and vertical edges 72 and 74. Walls 68 and 70 are disposed to contact each other at vertical edges 72 and 74 thereof when the tool is in its closed position, whereupon a barrier is formed to prevent the debris from falling out of the tool. Both the additional torque provided by gap 66 and the presence of the rear enclosure walls ensure that the debris is lifted and moved with ease and without loss of debris.

Each of the vertical lower extensions 20 and 38, the middle elongated arms 22 and 44, the lower elbows 24 and 40, the lower elbow fittings 26 and 42, the upper extensions 30 and 48 and the upper elbows 32 and 46 may be of any cross-sectional configuration; however, it is preferred that these elements be made of a tubular material. These elements can be made of metal or any conventional plastic so that the tool is light in weight yet rigid. Additionally, to facilitate the pivoting motion, it is desirable to provide an are 76 and 78 in each of the middle elongated arms 22 and 44 that is flattened on the side closest to the other arm and in the vicinity of pivot point 16. Furthermore, to reduce the costs of manufacturing, it is beneficial to make the entire arm from the upper extension 30 and 48 to the lower extension 20 and 38, respectively, of one integral unit of material.

Figure 3:
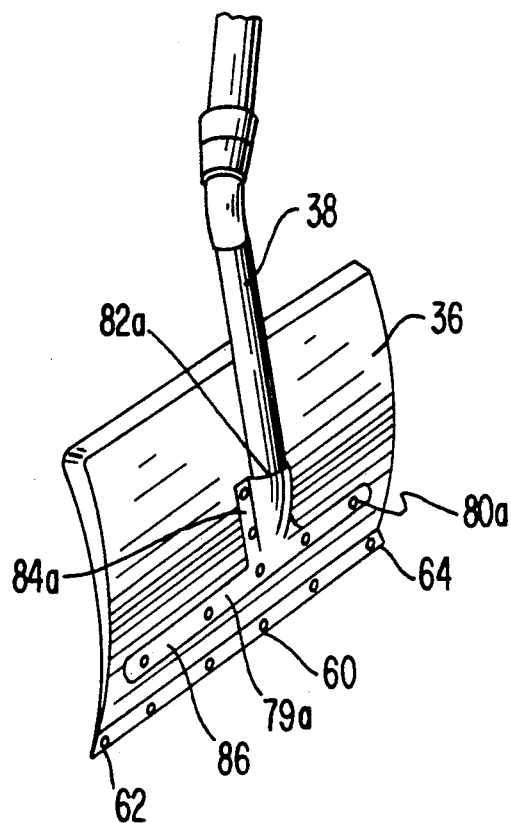
FIG. 3 is a perspective view of an alternative embodiment of the blade attachment means of the present invention.

The first and second blades are secured to the first and second vertical lower extensions by means of a blade fitting 79 secured to the blade by any conventional means 80 such as rivets. Blade fitting 79 is adapted to receive the vertical lower extension therein. Blade fitting 79, as depicted in FIG. 1, is adapted to conform to the concave surface of the blade and includes a tubular recess 82 adapted to receive the vertical lower extension therein and a pair of flanges 84 located on either side of the recess upon which the conventional securing means is disposed. An alternative embodiment of the blade fitting is shown in FIG. 3 showing a T-shaped bladed fitting 79a, again having provided a tubular recess 82a. However, in addition to flanges 84a on either side of the tubular recess, a second flange 86 is provided parallel to lower edge 60 with a row of conventional securing means 80a located thereon. It is to be understood that the blade fitting may be a separate component, as shown, or alternatively may be an integral part of the lower vertical extensions or the blades.

Figure 4:
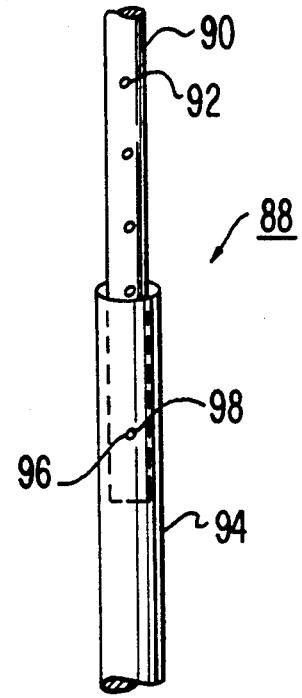
FIG. 4 is a view of an alternative embodiment of the height adjusting means of the present invention.
Figure 5:
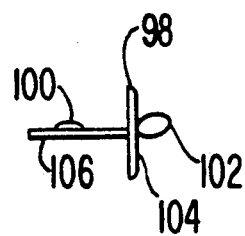
FIG. 5 is a detail view of a pin used in the embodiment of the present invention shown in FIG. 4.

As shown in FIGS. 4 and 5, a height adjusting means shown generally as 88 may be provided. Height adjusting means 88 may be located at middle elongated arms 22, 44 or vertical lower extensions 20, 38 and includes an extension bar 90 with a plurality of evenly spaced openings 92 located thereon, a receiving member 94 with a single opening 96 located thereon, and a pin 98 adapted to be received within one of the openings 92 and opening 96. Extension member 90 is slidably located within receiving member 94 such that any one of openings 92 on the extension member can be aligned with receiving member opening 96. As best seen in FIG. 5, pin 98 may be of conventional design and includes a securing means 100, such as a selectively retractable protrusion from the side of pin 98 that is retracted when pin 98 is inserted into openings 92 and 96. For instance, pin 98 may be a conventional "pip" pin, wherein by pulling a ring 102 away from an upper surface 104 of the pin, the securing means, or protrusion, 100 is caused to retract into a shaft 106 of the pin. When pin 98 is positioned within openings 92 and 96, ring 102 is released whereupon securing means 100 is permitted to protrude from shaft 106 such that pin 98 is held in place.

The use of the gathering tool is simple yet efficient. It can be seen from FIG. 1 that the tool is free standing; accordingly, the user does not have to bend down to pick the tool up. If using the height-adjustable embodiment of the invention, the user first adjusts the tool to the height most comfortable to the user. Once the leaves or other debris are raked together in a pile, the user grasps the tool at the upper elbows 32 and 46, whereupon the upper extensions 30 and 48 contact the user's forearms. The tool is then moved in the open position to the vicinity of the leaves. The user moves the upper extensions 30 and 48 toward each other, whereupon the blades 18 and 36 are moved toward each other. As the blades move toward the closed position, the leaves are caught between the two blades, whereupon the leaves are lifted and removed as the user lifts and moves the tool. When the tool is positioned over a receptacle for the leaves, the user pulls the upper extensions away from each other, and the leaves are released. As stated earlier, the straight lower edges 54 and 60 of the blades render the tool particularly effective in removing leaves since the lower edge scrape the ground, thus completely lifting the debris.

From the foregoing detailed description, it will be evident that there are a number of changes, adaptations and modifications of the present invention which come within the province of those having ordinary skill in the art to which the aforementioned invention pertains. However, it is intended that all such variations not departing from the spirit of the invention be considered as within the scope thereof, limited solely by the appended claims.

I claim:

1. A device for the gathering and lifting of debris, comprising:

a first pivot arm and a second pivot arm pivotally connected to said first pivot arm at a pivot point, said pivot arms being movable about said pivot point between an open position and a closed position;

said first pivot arm comprising a first blade, a first vertical lower extension mounted to said first blade, a first middle elongated arm mounted to said first lower extension by means of a first lower elbow, and a first upper extension mounted to said first middle arm by means of a first upper elbow, said first upper elbow being adapted to be grasped by the hand of a user whereupon said first upper extension will be located under and contacted by the forearm of the user;

said second pivot arm comprising a second blade, a second vertical lower extension mounted to said second blade, a second middle elongated arm mounted to said second lower extension by means of a second lower elbow, and a second upper extension mounted to said second middle arm by means of a second upper elbow, said second upper elbow being adapted to be grasped by the hand of a user whereupon said second upper extension will be located under and contacted by the forearm of the user;

said debris being collectible within said first and second blades when said pivot arms are in said closed position;

said first and second blades having an upper edge and a lower edge, the lower edges of said first and second blades having a forward portion and a rearward portion, said first and second blades being disposed such that when said pivot arms are in said closed position, said first and second blades contact one another at said rearward portion of said lower edges thereof;

a gap being formed between said forward portions of said first and second blade lower edges;

said device being free standing when said pivot arms are in said open position.

2. A device according to claim 1, wherein said first and second middle arms are disposed upwardly and rearwardly relative to said first and second lower extensions, respectively.

3. A device according to claim 1, wherein said first and second middle arms are disposed upwardly and rearwardly at a planar angle relative to said first and second lower extensions, respectively.

4. A device according to claim 3, wherein said planar angle is in the range of 90° to 180°.

5. A device according to claim 3, wherein said planar angle is approximately 135°.

6. A device according to claim 1, wherein said first and second upper extensions are disposed rearwardly and upwardly from an upper edge of said first and second middle arms, respectively.

7. A device according to claim 1, wherein said first and second upper extensions are disposed rearwardly and upwardly at a planar angle from an upper edge of said first and second middle arms, respectively.

8. A device according to claim 7, wherein said angle is such that said upper extensions are disposed at a slight angle from horizontal when said device is free standing.

9. A device according to claim 7, each of said upper extensions having a rearward end and a forward end, wherein said angle is such that said upper extensions are positioned with said rearward ends being slightly raised relative to said forward ends.

10. A device according to claim 7, wherein said angle is approximately 157½.

11. A device according to claim 1, wherein said first and second blades are solid.

12. A device according to claim 1, wherein said first and second blades are slightly concave in shape.

13. A device according to claim 1, wherein said gap between said forward portions of said lower edges of said blades has a width in the range of two to three inches.

14. A device according to claim 1, wherein said gap between said forward portions of said lower edges of said blades has a width of approximately two and one-half inches.

15. A device according to claim 1, wherein each of said first and second blades has a rear enclosure wall mounted at the rear thereof.

16. A device according to claim 15, wherein said rear enclosure walls are disposed to contact each other at vertical edges thereof when said pivot arms are in the closed position.

17. A device according to claim 1, further comprising a first blade fitting secured to said first blade and adapted to receive said first lower extension and a second blade fitting secured to said second blade and adapted to receive said second lower extension.

18. A device according to claim 17, wherein said blade fittings include a pair of flanges disposed on either side thereof, said flanges being secured to said blades by a conventional securing means.

19. A device according to claim 18, wherein said securing means is a rivet.

20. A device according to claim 17, wherein said blade fittings are T-shaped.

21. A device according to claim 1, wherein said first and second lower extensions, said first and second middle elongated arms, said first and second lower elbows, said first and second upper extensions, and said first and second upper elbows are made from a tubular material.

22. A device according to claim 21, wherein said middle elongated arms are flattened on one side thereof in the vicinity of said pivot point.

23. A device according to claim 1, wherein said first lower extension, said first middle elongated arm, said first lower elbow, said first upper extension, and said first upper elbow are one integral unit.

24. A device according to claim 23, wherein said integral unit is made from a tubular material.

25. A device according to claim 1, wherein said second lower extension, said second middle elongated arm, said second lower elbow, said second upper extension, and said second upper elbow are one integral unit.

26. A device according to claim 25, wherein said integral unit is made from a tubular material.

27. A device according to claim 1, further comprising a pin at said pivot point.

28. A device according to claim 1, further comprising a height adjusting means located on each of said middle elongated arms and permitting the extension or retraction of said middle elongated arms.

29. A device according to claim 28, wherein said height adjusting means comprises:
   an extension bar having a plurality of evenly spaced openings located thereon;
   a receiving member having an opening thereon; and
   a pin adapted to be received within one of said extension bar openings and said receiving member opening.

30. A device according to claim 29, wherein said pin includes a selectively retractable protrusion from the side thereof, said protrusion being retracted when said pin is inserted into said openings and protruding when said pin is positioned within said openings to hold said pin in place.

31. A device according to claim 1, further comprising a height adjusting means located on each of said vertical lower extensions and permitting the extension or retraction of said vertical lower extensions.

32. A device according to claim 31, wherein said height adjusting means comprises:
   an extension bar having a plurality of evenly spaced openings located thereon;
   a receiving member having an opening thereon; and
   a pin adapted to be received within one of said extension bar openings and said receiving member opening.

33. A device according to claim 32, wherein said pin includes a selectively retractable protrusion from the side thereof, said protrusion being retracted when said pin is inserted into said openings and protruding when said pin is positioned within said openings to hold said pin in place.

* * * * *

UNITED STATES PATENT AND TRADEMARK OFFICE
CERTIFICATE OF CORRECTION

PATENT NO. : 5,114,199
DATED : May 19, 1992
INVENTOR(S) : William L. Newcomer

It is certified that error appears in the above-identified patent and that said Letters Patent is hereby corrected as shown below:

On the title page of the patent, please add the word "deceased" after the inventor's name.

On the title page of the patent, please add the following assignment information:

William L. Newcomer, deceased
c/o Estate of William L. Newcomer
Danielle M. Newcomer, Legal Representative Signed and Sealed this Twenty-eight Day of February, 1995

Attest:

BRUCE LEHMAN

Attesting Officer

Commissioner of Patents and Trademarks